(12) United States Patent
Nicholson

(10) Patent No.: US 9,163,376 B2
(45) Date of Patent: Oct. 20, 2015

(54) POWER SYSTEM HAVING ATTACHMENT-BASED ENGINE CONTROL

(75) Inventor: Christian L. Nicholson, Raleigh, NC (US)

(73) Assignee: Caterpillar SARL, Geneva (CH)

( * ) Notice: Subject to any disclaimer, the term of this patent is extended or adjusted under 35 U.S.C. 154(b) by 761 days.

(21) Appl. No.: 13/330,347

(22) Filed: Dec. 19, 2011

(65) Prior Publication Data

US 2013/0158815 A1    Jun. 20, 2013

(51) Int. Cl.
| | |
|---|---|
| *E02F 9/20* | (2006.01) |
| *E02F 9/24* | (2006.01) |
| *E02F 3/96* | (2006.01) |
| *G06F 19/00* | (2011.01) |
| *E02F 3/34* | (2006.01) |
| *A01D 69/00* | (2006.01) |

(52) U.S. Cl.
CPC .............. *E02F 3/3414* (2013.01); *A01D 69/00* (2013.01); *E02F 9/2062* (2013.01); *E02F 9/24* (2013.01)

(58) Field of Classification Search
CPC ....... E02F 9/2062; E02F 9/2066; E02F 9/207; E02F 9/2075; E02F 9/2095; E02F 9/24; E02F 9/245
USPC .......................................................... 701/50
See application file for complete search history.

(56) References Cited

U.S. PATENT DOCUMENTS

| | | | |
|---|---|---|---|
| 5,878,557 | A  | 3/1999  | Wyffels et al. |
| 6,061,617 | A  | 5/2000  | Berger et al. |
| 6,397,571 | B1 | 6/2002  | Ehrecke |
| 6,923,285 | B1 | 8/2005  | Rossow et al. |
| 7,099,722 | B2 | 8/2006  | Casey |
| 7,441,404 | B2 | 10/2008 | Devier et al. |
| 7,945,378 | B2 | 5/2011  | Sheidler et al. |
| 7,992,370 | B2 | 8/2011  | Sheidler et al. |
| 2002/0175007 | A1 | 11/2002 | Strong |

FOREIGN PATENT DOCUMENTS

| | | |
|---|---|---|
| EP | 0866177 | 9/1998 |
| EP | 1486620 | 12/2004 |
| EP | 1964461 | 9/2008 |

*Primary Examiner* — Mussa A Shaawat
*Assistant Examiner* — Kyung Kim
(74) *Attorney, Agent, or Firm* — Finnegan, Henderson, Farabow, Garrett & Dunner, LLP

(57) ABSTRACT

A power system for a machine is disclosed. The power system may have an engine, and an operator input device controllable to affect operation of a plurality of different tools that can be removably attached to the machine. The plurality of different tools may include at least a first tool capable of consuming about 50% or more of a total power output of the engine. The power system may also have a controller configured to detect attachment of the at least a first tool to the machine and, based on a signal from the operator input device, selectively increase a power output of the engine when the at least a first tool is attached to the machine. The controller may also be configured to selectively decrease the power output of the engine when the at least a first tool is not attached to the machine.

20 Claims, 3 Drawing Sheets

US 9,163,376 B2

POWER SYSTEM HAVING ATTACHMENT-BASED ENGINE CONTROL

TECHNICAL FIELD

The present disclosure is directed to a power system and, more particularly, to a power system having attachment-based engine control.

BACKGROUND

Mobile construction and excavation machines, such as skid-steer loaders, integrated tool carriers, excavators, and other machines, are often capable of supporting and powering a variety of different tools to perform any number of assigned tasks. Some of these tools require extra electric or fluid power to operate. Onboard generators or pumps driven by a machine's engine provide the extra power to the tools during this time of need. Powered tools can be divided into at least two categories, including low-power tools that require a relatively low level of auxiliary power to operate effectively, and high-power tools that require higher amounts of auxiliary power. Accordingly, the engine of a machine capable of attachment to high-power tools should also be capable of relatively high power output.

Problems can occur when high-power machines that are capable of operation with high-power tools are operated with low-power tools or without any tools at all. For example, a skid-steer loader having an engine capable of producing high-levels of power, when operated with low-power tools or without tools, can direct too much power to traction devices of the machine. This excessive power directed to the traction devices can cause the traction devices to spin, thereby making the machine difficult to control and/or causing premature wear of machine components and lower machine efficiency.

An exemplary machine capable of operation with different types of tools is described in U.S. Pat. No. 6,397,571 of Ehrecke that issued on Jun. 4, 2002 ("the '571 patent"). Specifically, the '571 patent discloses a combine having an electronic engine controller that stores two power curves for controlling an engine. The first power curve has a higher horsepower output than the second power curve. A harvesting assembly detector signals the electronic engine controller with a corn head signal when a corn head is mounted to the combine, or a grain head signal when a grain platform is mounted to the combine. When a corn head is mounted to the combine, the electronic engine controller derates the engine and works on the second power curve. When the electronic engine controller receives a grain platform signal, the electronic engine controller works on the higher horsepower first power curve. Detection of the different harvesting assemblies can be accomplished by electronic hookup between each harvesting assembly and the combine.

Although the combine of the '571 patent may be capable of adjusting engine operation based on tool configuration, it may be less than optimal. In particular, the '571 patent does not disclose any action being taken when no tools are connected to the combine or even if operation without a tool is possible. Further, the '571 patent may not consider operator input when adjusting engine operation, which may cause undesired performance in some situations. Finally, detection of the different harvesting assemblies may be complex and/or prone to error.

The power system of the present disclosure is directed toward solving one or more of the problems set forth above and/or other problems of the prior art.

SUMMARY

One aspect of the present disclosure is directed to a power system for a machine. The power system may include an engine, and an operator input device controllable to affect operation of a plurality of different tools that can be removably attached to the machine. The plurality of different tools may include at least a first tool capable of consuming about 50% or more of a total power output of the engine. The power system may also include a controller in communication with the engine and the operator input device. The controller may be configured to detect attachment of the at least a first tool to the machine and, based on a signal from the operator input device, selectively increase a power output of the engine when the at least a first tool is attached to the machine. The controller may also be configured to selectively decrease the power output of the engine when the at least a first tool is not attached to the machine.

Another aspect of the present disclosure is directed to a method of operating a power system. The method may include receiving operator input regarding operation of at least a first tool of a plurality of different tools that can be removably attached to the machine. The at least a first tool may be capable of consuming about 50% or more of a total engine power output of the machine. The method may also include detecting attachment of the at least a first tool to the machine and, based on the operator input, selectively increasing an engine power output of the machine when the at least a first tool is attached to the machine. The method may additionally include selectively decreasing the engine power output when the at least a first tool is not attached to the machine.

DETAILED DESCRIPTION

Figure 1:
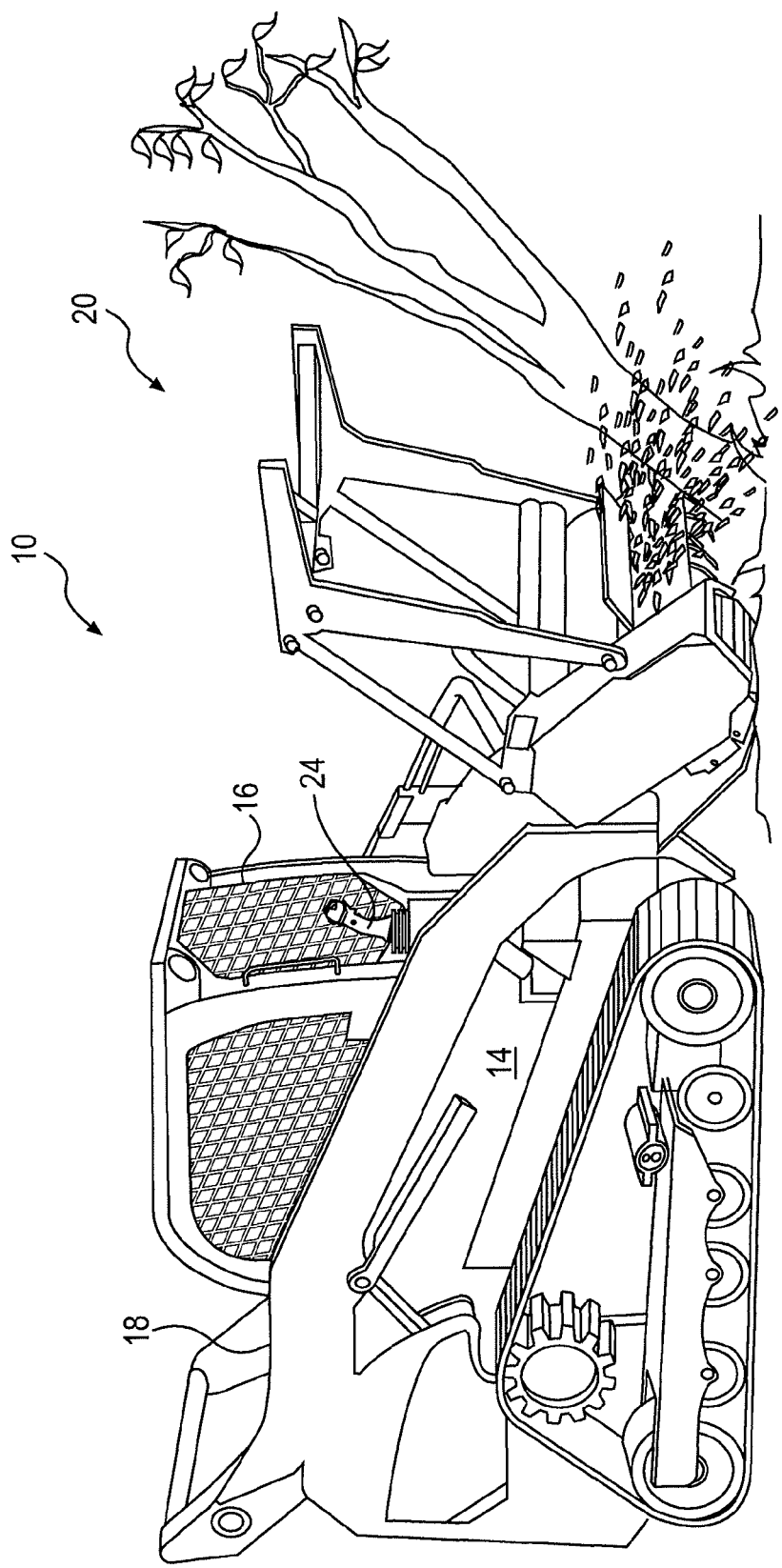
FIG. 1 is a pictorial illustration of an exemplary disclosed machine.

FIG. 1 illustrates an exemplary mobile machine 10 that performs some type of operation associated with an industry such as mining, construction, farming, or another industry known in the art. For example, machine 10 may be a skid-steer loader (shown in FIG. 1), an integrated tool carrier, a material handler, a backhoe, or any other machine known in the art. Machine 10 may include, among other things, a frame 14 at least partially defining an operator station 16 and supporting an engine 18, and a work tool 20 removably attachable to frame 14. Engine 18 may generate a power output directed to propel machine 10 and to move work tool 20. Operator station 16 may include any number and type of input devices used by an operator for control of work tool 20.

Numerous different work tools 20 can be removably attached to a single machine 10 and controllable via operator station 16. Work tool 20 may include any device used to perform a particular task such as, for example, a bucket, a fork arrangement, a blade, a shovel, a ripper, a dump bed, a broom, a snow blower, a post-hole digger, a brush cutter, a cold planer, a mulcher (shown in FIGS. 1 and 2), or any other task-performing device known in the art. Work tool 20 may be connected to work machine 10 via a direct pivot, via a linkage system, via one or more hydraulic and/or electric power lines, via an actuator, or in any other appropriate manner. Work tool 20 may be configured to pivot, rotate, slide, swing, lift, or move relative to work machine 10 in any manner known in the art.

The different work tools 20 that can be attached to machine 10 may be divided into several different categories. For example, work tools 20 may first be divided into powered and non-powered types of tools. Powered tools may include those tools that have one or more integral actuators (e.g., linear or rotary type hydraulic or electric actuators) that receive auxiliary power from engine 18 and are controllable via operator station 16 to perform specialized functions. Examples of powered tools may include a broom, a snow-blower, a post-hole digger, a brush cutter, a cold planer, and a mulcher. Non-powered tools may include those tools that are moved via actuators and/or linkage that are part of a normal makeup of machine 10 and do not include their own integral actuators that require auxiliary power from engine 18. Examples of non-powered tools may include a fork arrangement, a bucket, a blade, a dump bed, and a ripper.

The powered tools of machine 10 may be further divided into at least two different categories, including a low-power category and a high-power category. Tools in the low-power category are tools that consume relatively lower amounts of auxiliary power from engine 18 during operation (e.g., less than a threshold amount) and, accordingly, engine 18 is not required to operate substantially differently when supplying auxiliary power to the low-power tools. Examples of low-power tools may include a broom, a snow-blower, and a post-hole digger. In these examples, the low-power tools may be capable of consuming, at most, about 50% of the total power output of engine 18. Tools in the high-power category are tools that consume relatively higher levels of auxiliary power from engine 18 during operation (e.g., more than the threshold amount and about 10-30% more power than the low-power tools) and, accordingly, engine 18 may be required to operate at a substantially higher output level when the high-power tools are connected to machine 10 in order to adequately supply all of the demands of machine 10. Examples of high-power tools may include a brush cutter, a cold planer, and a mulcher. In these examples, the high-power tools may be capable of consuming about 50% or more of the total power output of engine 18. Each of the exemplary high-power tools provided above includes at least one integral hydraulically-driven actuator that requires a relatively high flow of pressurized fluid from an engine-driven pump 22 (shown only in FIG. 2). Accordingly, these high-power tools may also be known as high-flow tools, if desired.

Operator station 16 may be configured to receive input from a machine operator indicative of a desired movement of work tool 20 and generate corresponding signals. Specifically, operator station 16 may include an operator input device 24 embodied, for example, as a multi-axis joystick located within operator station 16. Operator input device 24 may be a proportional-type controller configured to position and/or orient work tool 20 and to produce one or more interface device position signals indicative of a desired operation of work tool 20. It is contemplated that additional and/or different operator input devices may be included within operator station 16 such as, for example, wheels, knobs, push-pull devices, switches, pedals, and other input devices known in the art.

Figure 2:
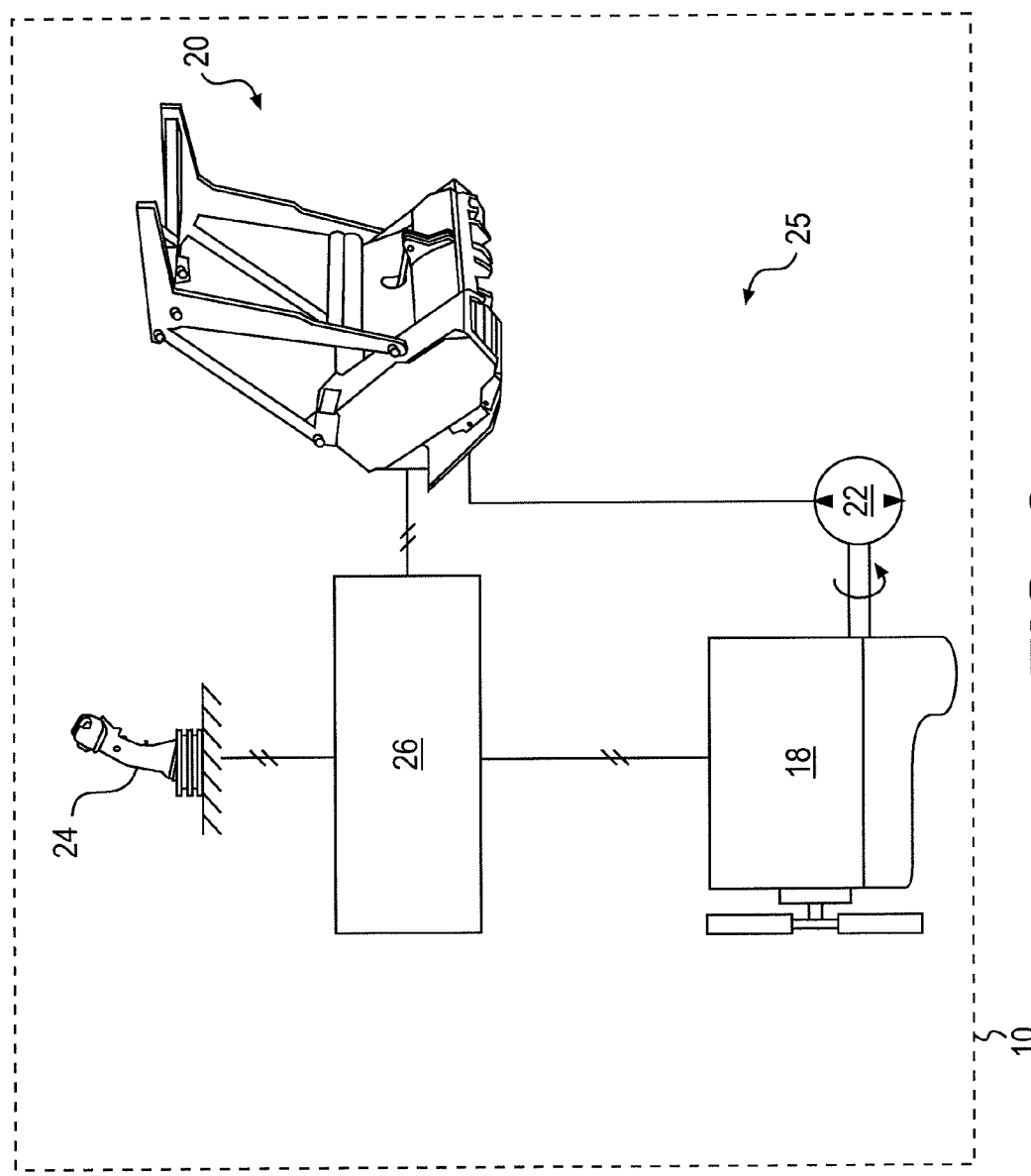
FIG. 2 is a pictorial illustration of an exemplary disclosed power system that may be used with the machine of FIG. 1.

As illustrated in FIG. 2, machine 10 may include a power system 25 having a controller 26 that cooperates with engine 18 to control work tool 20 in response to signals received from input device 24. Controller 26 may be a single microprocessor or multiple microprocessors that include a means for controlling an operation of power system 25. Numerous commercially available microprocessors can be configured to perform the functions of controller 26. It should be appreciated that controller 26 could readily be embodied in a general power system microprocessor capable of controlling numerous power system and/or machine functions. Controller 26 may include a memory, a secondary storage device, a processor, and any other components for running an application. Various other circuits may be associated with controller 26 such as power supply circuitry, signal conditioning circuitry, solenoid driver circuitry, and other types of circuitry.

One or more maps relating desired engine power output, work tool configuration (e.g., attachment of a low-power tool, a high-power tool, or no tool), and/or operator input (e.g., signals indicative of desired activation of the attached tool) may be stored in the memory of controller 26. Each of these maps may be in the form of tables, graphs, and/or equations. Controller 26 may be configured to reference a type of work tool 20 attached to machine 10 and/or input from an operator of machine 10 with the relationship maps to determine control parameters affecting operation of engine 18 and/or work tool 20. For example, controller 26 may be configured to detect attachment of a low- or a high-power tool to machine 10, determine an operator's desire to drive the integral actuator of work tool 20 and, based on the detection and the determination, select for use in controlling engine 18 a low- or high-power control map (e.g., a torque limit map). Controller 26 may then be configured to issue commands to engine 18, based on the selected map, thereby causing engine 18 to produce a lower or higher level of auxiliary power (e.g., about 10-30% more power) for use by work tool 20. It is contemplated that controller 26 may be further configured to allow an operator of machine 12 to directly modify these maps and/or to select specific maps from available relationship maps stored in the memory of controller 26 to affect operation of machine 10. It is also contemplated that the maps may be automatically selected for use based on different modes of operation of machine 10, if desired.

Figure 3:
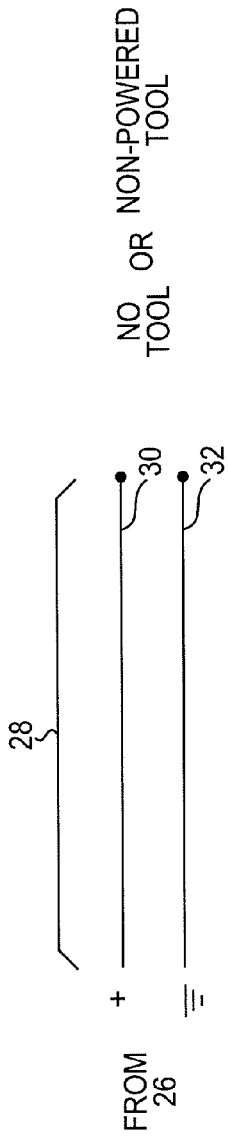
FIGS. 3-5 are schematic illustrations of exemplary disclosed wiring harnesses that may be used in conjunction with the power system of FIG. 2.
Figure 4:
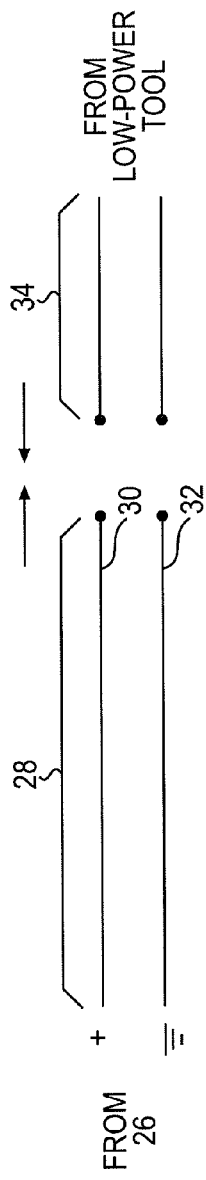
Figure 5:
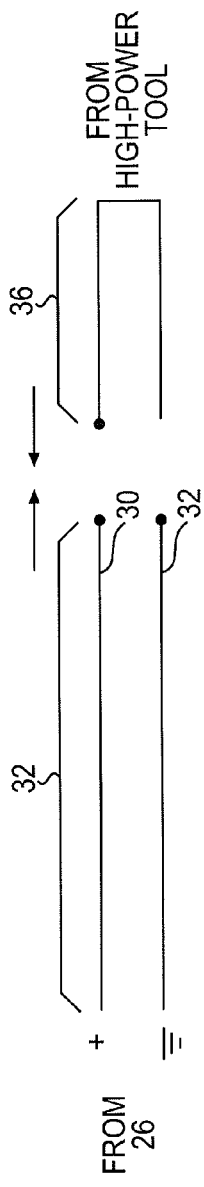

As shown in FIGS. 3-5, controller 26 may detect attachment of the low- or high-power tools to machine 10 based on engagement of a system wiring harness 28 with a first tool wiring harness 34 and a second tool wiring harness 36. System wiring harness 28 may include, among other things, an indicator wire 30 and a ground wire 32. Controller 26 may be configured to generate a voltage between indicator and ground wires 30, 32 of a specified potential, and measure a change in the potential during engagement of system wiring harness 28 with either of first and second tool wiring harnesses 34, 36. In one example, the specified potential of voltage generated by controller 26 may be about 8-10 volts. When work tool 20 is not attached to machine 10 (or a particular work tool 20 that does not have a wiring harness is attached to machine 10), system wiring harness 28 would not be engaged with either of first or second wiring harnesses 34, 36 and, accordingly, a circuit would not be created between indicator and ground wires 30, 32. In this situation, the voltage measured by controller 26 between indicator and ground wires 30, 32 may be maintained at the specified potential (i.e., at about 8-10 volts). This situation may correspond with the illustration of FIG. 3.

First tool wiring harness 34 (referring to FIG. 4) may be associated with a non-powered or low-power tool that does not require substantial amounts of auxiliary power from engine 18. First tool wiring harness 34 may include any number of wires (or even no wires at all) arranged in an open-circuit configuration. Accordingly, during attachment of work tool 20 to machine 10 in this situation, although first wiring harness 34 would engage system wiring harness 28 as part of the attachment process, a circuit connection between indicator and ground wires 30, 32 still would not be established. That is, indicator wire 30 may remain substantially isolated from ground wire 32 during engagement of first tool wiring harness 34 with system wiring harness 28. For this reason, the voltage between indicator and ground wires 30, 32 may be maintained at the specified potential (i.e., at about 8-10 volts) during attachment of a non-powered or low-power tool with machine 10. It is contemplated that some amount of auxiliary power may be directed through first tool wiring harness 34 to power the integral actuators of work tool 20, if desired, although this level of power may be relatively low when compared with the amount of power directed into a high-power tool.

Second tool wiring harness 36 (referring to FIG. 5) may be associated only with tools that are classified as high-power tools (i.e., with tools having integral actuators that require a level of auxiliary power from engine 18 greater than the threshold amount). Second tool harness 36 may include any number of wires arranged in a closed-circuit configuration such that, when system wiring harness 28 is engaged with second tool wiring harness 36, a connection between indicator and ground wires 30, 32 would be established that lowers the voltage potential between indicator and ground wires 30, 32. In one example, the connection between indicator and ground wires 30, 32 that is established by engagement of second tool wiring harness 36 with system wiring harness 28 may lower the potential to about zero volts. It should be noted that, in the disclosed embodiment, attachment of the high-power tool to machine 10 (i.e., that engagement of second tool wiring harness 36 with system wiring harness 28) does not necessarily provide information regarding the identity of work tool 20 to controller 26, but instead is primarily intended to provide controller 26 with an indication that the connected work tool 20 is a high-power tool requiring a greater amount of auxiliary power from engine 18. In this situation, controller 26 may select the high-power map for use in controlling engine 18.

Controller 26 may also consider operator input when regulating operation of engine 18 based on attachment of a low- or high-power tool. In particular, in some embodiments, controller 26 may be configured to use the high-power map when controlling engine 18 after attachment of the high-power tool to machine 10, but only when the operator of machine 10 requests, via input device 24, a movement of work tool 20 that actually requires a high level of auxiliary power (e.g., only when an operator requests that high-speed rotation of cutting heads on a mulcher be initiated). That is, there may be times after connection of the high-power tool to machine 10 that the high-power tool is not activated by the operator or activated at only a low-power level (e.g., at a level that consumes less than the threshold amount of auxiliary power). At these times, controller 26 may continue to regulate operation of engine 18 according to the low-power control map until the operator requests activation of the high-power tool at an elevated power-consuming level.

INDUSTRIAL APPLICABILITY

The power system of the present disclosure has wide application in a variety of machine types including, for example, skid-steer loaders. The disclosed power system finds particular applicability with compact machines where excessive power output of a corresponding engine can cause the machine to spin or experience instabilities and inefficiencies. The disclosed power system may function to reduce spinning and improve stability and efficiency of the machine by allowing operation of the machine at high power levels only when high-power tools are attached to the machine. When low-power tools or no tools at all are attached to the machine, the power system may selectively adjust engine power output to reduced levels. The reduced spinning may help to improve traction of the machine and increase efficiency, while also reducing wear of the traction devices. The disclosed power system may also improve machine performance by allowing operation at high power levels only when operations requested by the operator actually require the high power levels. The disclosed power system may detect attachment of low- and high-power tools through a simple wiring harness interface.

It will be apparent to those skilled in the art that various modifications and variations can be made to the power system of the present disclosure without departing from the scope of the disclosure. Other embodiments will be apparent to those skilled in the art from consideration of the specification and practice of the power system disclosed herein. It is intended that the specification and examples be considered as exemplary only, with a true scope of the disclosure being indicated by the following claims and their equivalents.

What is claimed is:

1. A power system for a machine, comprising:
   an engine;
   an operator input device controllable to affect operation of a plurality of different tools that can be removably attached to the machine, the plurality of different tools including at least a first tool capable of consuming about 50% or more of a total power output of the engine; and
   a controller in communication with the engine and the operator input device, the controller being configured to:
   detect attachment of the at least first tool to the machine;
   determine an operator's desire to activate the at least first tool based on a signal from the operator input device;
   based on the detection and the determination, selectively increase a power output of the engine when the at least first tool is attached to the machine; and
   based on the detection and the determination, selectively decrease the power output of the engine when the at least first tool is not attached to the machine.

2. The power system of claim 1, wherein the controller is configured to decrease the power output of the engine regardless of operator input, when the at least first tool is not attached to the machine.

3. The power system of claim 1, wherein the at least first tool is a hydraulically powered tool configured to consume a high flow rate of pressurized fluid.

4. The power system of claim 1, further including:
   a system wiring harness connected to the controller and having a ground wire and an indicator wire; and
   at least one tool wiring harness capable of connection with the plurality of different tools and configured to engage the system wiring harness,
   wherein the controller is configured to detect attachment of the plurality of different tools with the machine based on a voltage between the indicator wire and the ground wire during engagement of the at least one tool wiring harness with the system wiring harness.

5. The power system of claim 4, wherein:
   the at least one tool wiring harness includes at least a first tool wiring harness associated with the at least first tool; and engagement of the at least first tool wiring harness with the system wiring harness results in a reduction in voltage between the ground and indicator wires below a specified potential.

6. The power system of claim 5, wherein when the plurality of different tools are not connected to the machine, the specified potential is maintained between the ground and indicator wires.

7. The power system of claim 6, wherein:
the at least one tool wiring harness further includes at least a second tool wiring harness associated with at least a second of the plurality of different tools, the at least second tool capable of consuming at most an amount of power less than the threshold amount; and
when the at least second tool wiring harness engages the system wiring harness, the specified potential is maintained between the ground and indicator wires.

8. The wiring harness of claim 7, wherein:
when the at least first tool wiring harness is engaged with the system wiring harness, the indicator wire is connected to the ground wire; and
when the plurality of different tools are not connected to the machine or when the at least second tool wiring harness is engaged with the system wiring harness, the indicator wire is substantially isolated from the ground wire.

9. The power system of claim 1, wherein the at least first tool is one of a brush cutter, a cold planer, and a mulcher.

10. The power system of claim 9, wherein the at least first tool is mounted to the machine at an end opposite the engine.

11. The power system of claim 10, wherein the controller is configured to selectively increase the power output of the engine when the at least first tool is attached to the machine and the operator input device is manipulated by an operator of the machine to initiate a movement of the at least first tool that requires the at least first tool to consume at least the threshold amount of power.

12. The power system of claim 1, wherein the controller is configured to increase the power output of the engine by about 10-30% when the at least first tool is attached to the machine.

13. A method of operating a power system in a machine, comprising:
receiving operator input regarding operation of at least a first tool of a plurality of different tools that can be removably attachable to the machine, the at least first tool being capable of consuming about 50% or more of a total engine power output of the machine;
detecting attachment of the at least first tool to the machine;
determining an operator's desire to activate the at least first tool;
based on the detection and the determination, selectively increasing an engine power output of the machine when the at least first tool is attached to the machine; and
based on the detection and the determination, selectively decreasing the engine power output when the at least first tool is not attached to the machine.

14. The method of claim 13, wherein selectively decreasing includes selectively decreasing the engine power output regardless of operator input.

15. The method of claim 13, wherein detecting attachment of the at least first tool to the machine includes detecting a voltage between an indicator wire and a ground wire below a specified potential during engagement of a first tool wiring harness with a system wiring harness.

16. The method of claim 15, wherein the specified potential is maintained when a second tool wiring harness associated with another of the plurality of different tools engages the system wiring harness and when the system wiring harness is not engaged with the first tool wiring harness.

17. The method of claim 13, wherein:
the at least first tool is one of a brush cutter, a cold planer, and a mulcher; and
the machine is a skid-steer loader.

18. The method of claim 13, wherein selectively increasing the engine power output includes selectively increasing the engine power output by about 10-30%.

19. The method of claim 13, wherein selectively increasing an engine power output based on the operator input includes increasing the engine power output only when the operator input is associated with a requested activation of the at least first tool that requires the at least first tool to consume at least the threshold amount of power.

20. A machine, comprising
an engine;
a frame configured to support the engine and a plurality of different hydraulic work tools that could be removably attached to the machine, the plurality of different tools including at least a first hydraulic tool capable of consuming at least about 50% of a total power output of the engine;
a system wiring harness having an indicator wire and a ground wire;
at least one tool wiring harness associated with the plurality of different hydraulic work tools and configured to engage the system wiring harness;
an operator input device controllable to affect operation of the plurality of different hydraulic work tools; and
a controller in communication with the engine, the operator input device, and the system wiring harness, the controller being configured to:
detect attachment of the at least first hydraulic tool to the frame based a voltage between the indicator wire and the ground wire during engagement of the at least one tool wiring harness with the system wiring harness;
determine an operator's desire to activate the at least first hydraulic tool based on a signal from the operator input device;
based on the detection and the determination, selectively increase a power output of the engine when the at least first tool is attached to the frame and the operator input device is manipulated by an operator of the machine to initiate a movement of the at least first tool that the at least first hydraulic tool to consume at least the threshold amount of power; and
based on the detection and the determination, selectively decrease the power output of the engine by about 10-30% when the at least first hydraulic tool is not attached to the frame, regardless of manipulation of the operator input device.

* * * * *